United States Patent
Forrest et al.

(10) Patent No.: US 7,971,463 B2
(45) Date of Patent: Jul. 5, 2011

(54) STIR FORMING APPARATUS

(75) Inventors: Robert S. Forrest, Santa Ana, CA (US); Douglas J. Waldron, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/193,253

(22) Filed: Aug. 18, 2008

(65) Prior Publication Data

US 2008/0302154 A1 Dec. 11, 2008

Related U.S. Application Data

(62) Division of application No. 10/639,033, filed on Aug. 12, 2003, now Pat. No. 7,448,528.

(51) Int. Cl.
*B21B 11/00* (2006.01)
*B23K 20/12* (2006.01)

(52) U.S. Cl. ............... 72/67; 72/75; 72/112; 72/125; 228/2.3

(58) Field of Classification Search .............. 72/67, 69, 72/112, 115, 125, 126, 75; 228/112.1, 114.5, 228/2.1, 2.3
See application file for complete search history.

(56) References Cited

U.S. PATENT DOCUMENTS

| | | |
|---|---|---|
| 3,470,720 A | 10/1969 | Eklund et al. |
| 3,738,139 A | 6/1973 | Proops et al. |
| 3,815,395 A | 6/1974 | Sass |
| 4,150,279 A | 4/1979 | Metcalfe et al. |
| 4,754,635 A | 7/1988 | van den Berg et al. |
| 4,998,663 A | 3/1991 | Cakmak et al. |
| 5,262,123 A | 11/1993 | Thomas et al. |
| 5,460,317 A * | 10/1995 | Thomas et al. ............ 228/112.1 |
| 5,469,617 A | 11/1995 | Thomas et al. |
| 5,486,262 A | 1/1996 | Searle |
| 5,611,479 A | 3/1997 | Rosen |
| 5,697,544 A | 12/1997 | Wykes |
| 5,697,545 A | 12/1997 | Jennings et al. |
| 5,713,507 A | 2/1998 | Holt et al. |
| 5,718,366 A | 2/1998 | Colligan |
| 5,893,507 A | 4/1999 | Ding et al. |
| 6,003,228 A | 12/1999 | Riggio |

(Continued)

FOREIGN PATENT DOCUMENTS

JP 2003-181655 * 7/2003

OTHER PUBLICATIONS http://dictionary.reference.com, "formed, forming, forms" (verb) p. 1, "dome" p. 1, "shoulder" pp. 1-2, "connect" pp. 1-2.

*Primary Examiner* — Edward Tolan
(74) *Attorney, Agent, or Firm* — Alston & Bird LLP

(57) ABSTRACT

An apparatus for forming a workpiece to a desired, nonplanar configuration are provided. At least one friction stir forming tool, having a shoulder and a pin, is used to urge the workpiece to the desired configuration and friction stir form the workpiece. The forming tool can urge the workpiece against a contour surface of a die or a shoulder that is opposite the structural member from the tool. Thus, the forming tool plasticizes a portion of the workpiece and urges the workpiece to the desired configuration. In addition, the material properties of the workpiece can be improved by the friction stir processing.

7 Claims, 4 Drawing Sheets

U.S. PATENT DOCUMENTS

| | | | |
|---|---|---|---|
| 6,068,178 | A | 5/2000 | Michisaka |
| 6,070,784 | A | 6/2000 | Holt et al. |
| 6,193,137 | B1 | 2/2001 | Ezumi et al. |
| 6,216,508 | B1 * | 4/2001 | Matsubara et al. ............... 72/43 |
| 6,237,835 | B1 * | 5/2001 | Litwinski et al. .......... 228/112.1 |
| 6,247,634 | B1 | 6/2001 | Whitehouse |
| 6,299,048 | B1 | 10/2001 | Larsson |
| 6,299,050 | B1 * | 10/2001 | Okamura et al. .......... 228/110.1 |
| 6,419,142 | B1 | 7/2002 | Larsson |
| 6,421,578 | B1 | 7/2002 | Adams et al. |
| 6,450,395 | B1 | 9/2002 | Weeks et al. |
| 6,532,786 | B1 * | 3/2003 | Luttgeharm ................... 72/115 |
| 6,601,751 | B2 | 8/2003 | Iwashita |
| 6,660,106 | B1 * | 12/2003 | Babel et al. .................. 148/527 |
| 6,779,707 | B2 | 8/2004 | Dracup et al. |
| 6,854,634 | B2 * | 2/2005 | Litwinski et al. .......... 228/112.1 |
| 6,866,180 | B2 | 3/2005 | Mahoney et al. |
| 6,886,732 | B2 * | 5/2005 | Yoshinaga ..................... 228/2.3 |
| 7,080,438 | B2 * | 7/2006 | Murakami ...................... 29/428 |
| 7,198,189 | B2 * | 4/2007 | Stol et al. ....................... 228/2.1 |
| 7,464,852 | B2 * | 12/2008 | Waldron et al. ............ 228/112.1 |
| 2001/0019073 | A1 | 9/2001 | Ezumi |
| 2002/0030083 | A1 | 3/2002 | Engelhard et al. |
| 2002/0050508 | A1 | 5/2002 | Yoshinaga |
| 2002/0190103 | A1 | 12/2002 | Yoshinaga |
| 2002/0190104 | A1 | 12/2002 | Yoshinaga |
| 2003/0218052 | A2 | 11/2003 | Litwinski |
| 2004/0159696 | A1 | 8/2004 | Mahoney et al. |

\* cited by examiner

STIR FORMING APPARATUS

CROSS-REFERENCE TO RELATED APPLICATION

This application is a divisional of U.S. patent application Ser. No. 10/639,033, filed Aug. 12, 2003 now U.S. Pat. No. 7,448,528, which is hereby incorporated herein in its entirety by reference.

BACKGROUND OF THE INVENTION

1) Field of the Invention

The present invention relates to the forming of structural members and, more particularly, to the forming of structural members in conjunction with friction stir processing.

2) Description of Related Art

The forming of structural members to desired shapes can be accomplished by forging, stamping, bending, machining, and the like. For example, a preform or blank comprising a flat sheet of metal such as steel, aluminum, titanium, or alloys thereof can be heated in a forge and hammered to the desired shape of the member. Alternatively, a mechanical or hydraulic press can be used to stamp or forge the structural member to the desired shape, e.g., between two opposing dies that define forming surfaces that correspond to the desired contour of the member. Such forming methods are typically quicker and less expensive than casting molten material in the desired shape, and complex shapes can be imparted to the member, such as curves, angles, and the like. However, depending on the particular material of the preform, cracks or weakened portions may result from excessive forming, e.g., the formation of sharp angles or other significant deformations. Therefore, the formation of a particular complex structural member may require that multiple elementary members are formed and then joined by welding or other joining methods. Further, subsequent material processing, e.g., heat treatments such as solution heat treating, aging, and quenching, may be required to achieve desired properties in the formed member. These additional operations add to the manufacturing time and cost of the structural members.

The structural members can also be treated before being formed to the desired shape. For example, according to one proposed method, a preform is supported in a flat configuration, and a friction stir welding tool is inserted into the preform and rotated to plasticize the material of the preform. The friction stir-welding tool is then moved continuously over the surface of the preform so that part of the preform is friction stir processed. The preform is then formed, for example, by forging, stamping, bending, or the like, to the desired shape of the member. Such friction stir processing refines the granular structure of the preform, improving the material properties of the structural member. However, this process is also time-consuming and adds to the cost of the structural member.

Thus, there exists a need for an improved apparatus and process for forming structural members. The process should be capable of forming various configurations of structural members, including those with complex geometric configurations. Further, the process should result in structural members having desired material properties.

BRIEF SUMMARY OF THE INVENTION

The present invention provides an apparatus and method for forming a workpiece to a desired, non-planar configuration with at least one friction stir forming tool. The forming tool plasticizes a portion of the workpiece and urges the workpiece to the desired configuration, thereby refining the grain structure of the workpiece. Thus, the workpiece can be formed to any desired configuration, including complex shapes. In addition, the material properties of the workpiece can be improved.

According to one embodiment of the present invention, the apparatus includes a die defining a contour surface such as a dome shape that corresponds to the desired configuration of the workpiece. The die can also define a detail feature corresponding to a feature that is to be formed on the workpiece. A friction stir forming tool, including a shoulder and a rotatable pin extending therefrom, is configured to urge the shoulder and pin toward the contour surface of the die. Thus, the shoulder urges the workpiece against the die and to the desired configuration, and the pin at least partially penetrates the workpiece and rotates to form a friction stir formed region defined by a refined granular structure. The apparatus also includes an actuator for adjusting the friction stir forming tool along a predefined path corresponding to the contour surface of the die, e.g., in at least two linear directions and about at least two axes of rotation. The die can also be rotated relative to the forming tool.

According to another embodiment of the present invention, the apparatus includes first and second friction stir forming tools in an opposing configuration so that the shoulders are directed generally inward to receive a workpiece therebetween. The forming tools are adjusted by one or more actuators in an inward direction against opposite sides of the workpiece so that the pins at least partially penetrate the workpiece. The pins are rotated to form a friction stir formed region in the workpiece, and the actuator adjusts the friction stir forming tools along a predefined path corresponding to the desired, non-planar configuration of the workpiece so that the shoulders urge the workpiece to the desired configuration.

The present invention also provides a method for forming a workpiece. The workpiece is supported at least partially against the die, and the shoulder of the forming tool is urged against the workpiece. The pin at least partially penetrates the workpiece and the workpiece is bent against the contour surface. The pin of the tool is rotated in the workpiece to plasticize a portion of the workpiece, thereby forming a friction stir formed region having a refined grain structure. The tool is adjusted in a predefined path that corresponds to the contour surface of the die so that the shoulder urges the workpiece to the desired, non-planar configuration. An entire surface of the workpiece can be plasticized, thereby refining the grain structure of the workpiece over the surface. Further, two or more structural members can be provided and joined to form the workpiece.

A method according to another embodiment of the present invention includes forming the workpiece by first and second friction stir forming tools, which are configured in an opposing configuration so that the shoulders are directed generally inward toward the workpiece supported therebetween. The shoulders of the first and second tools are urged against the respective sides of the workpiece, and the pins of the first and second tools at least partially penetrate the respective sides. The pins are rotated to plasticize opposite portions of the workpiece, thereby forming opposite friction stir formed regions having refined grain structure in the workpiece. The tools are also adjusted in corresponding predefined paths so that the shoulders urge the workpiece to the desired, non-planar configuration.

BRIEF DESCRIPTION OF THE SEVERAL VIEWS OF THE DRAWINGS

Figure 1:
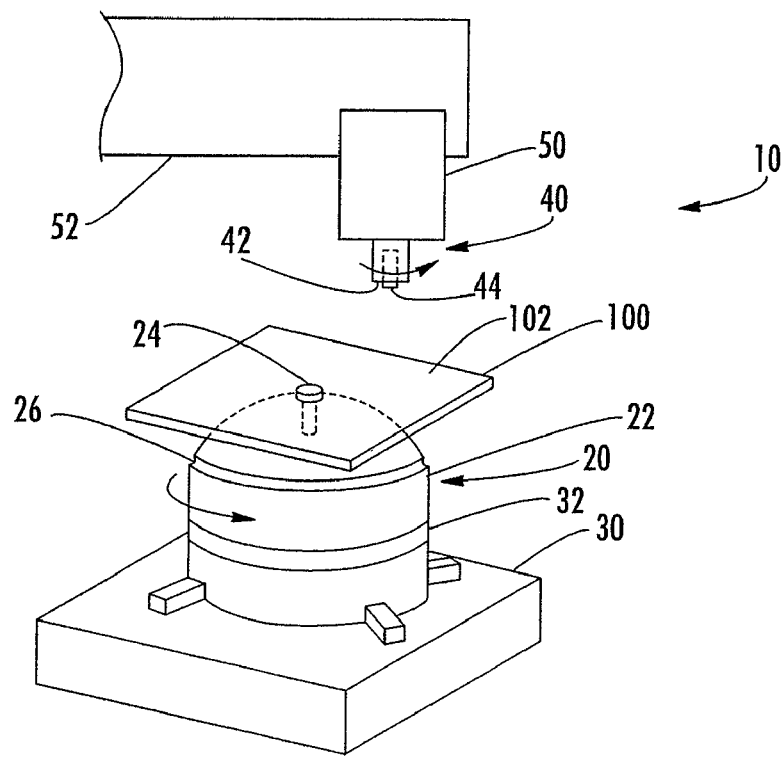
Figure 2:
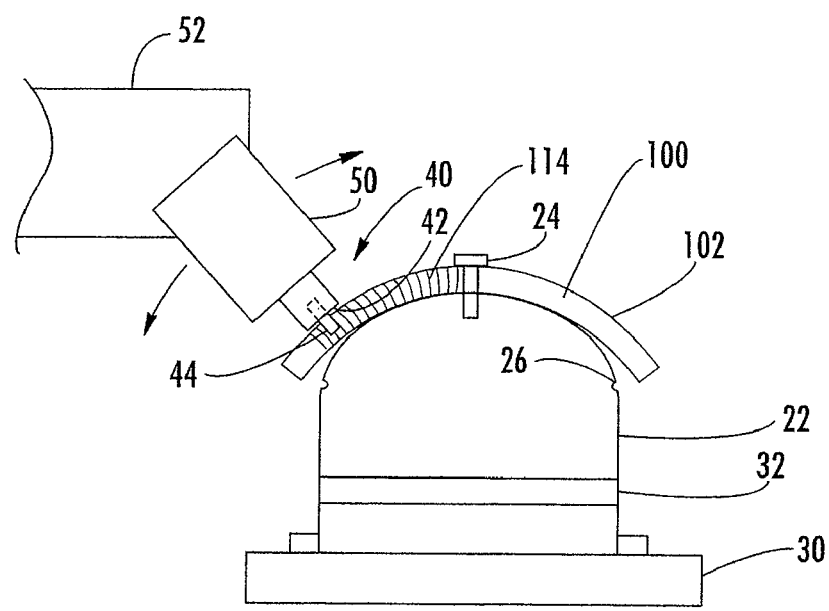
Figure 3:
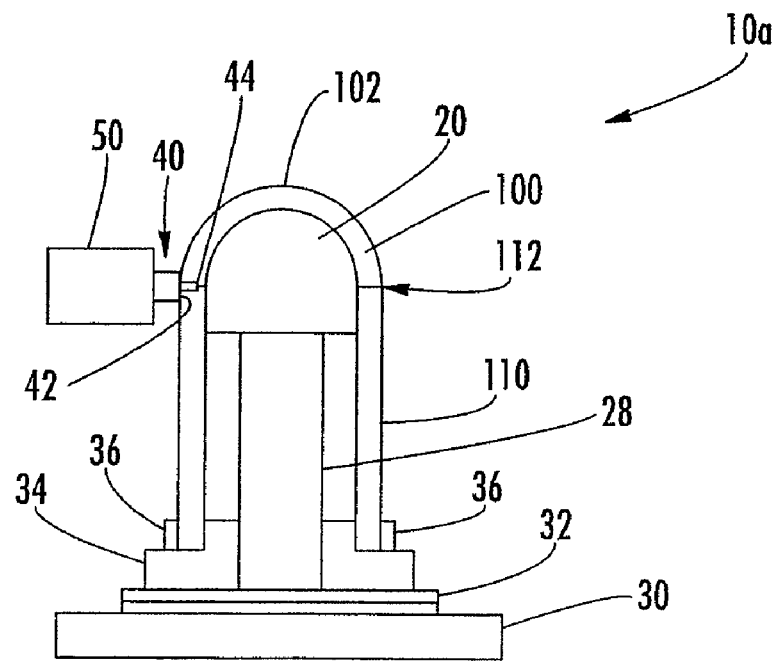
Figure 4:
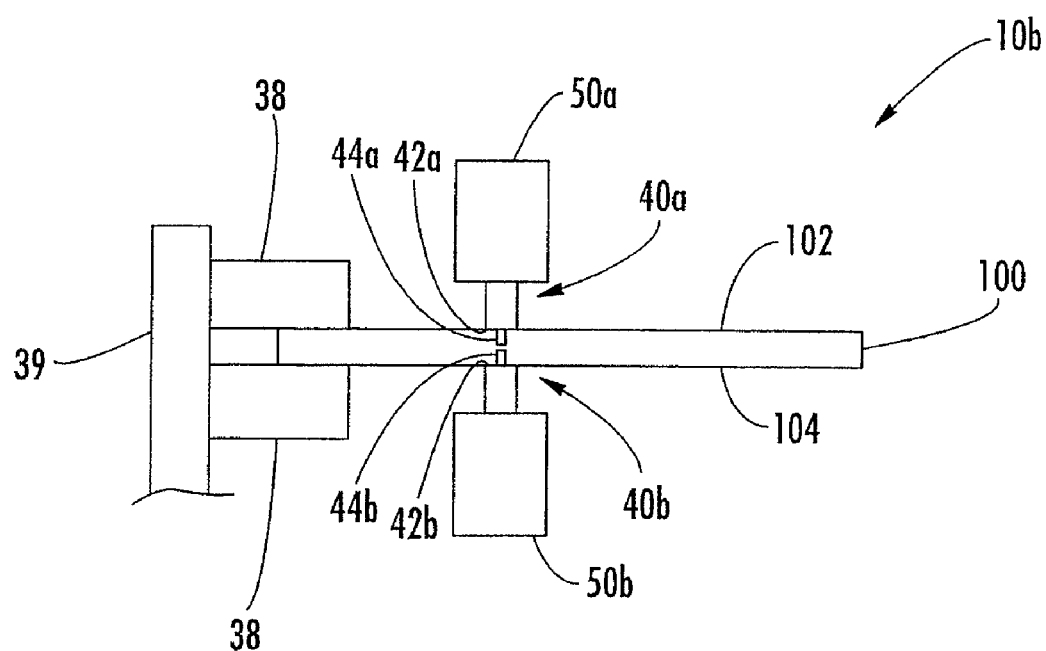
Figure 5:
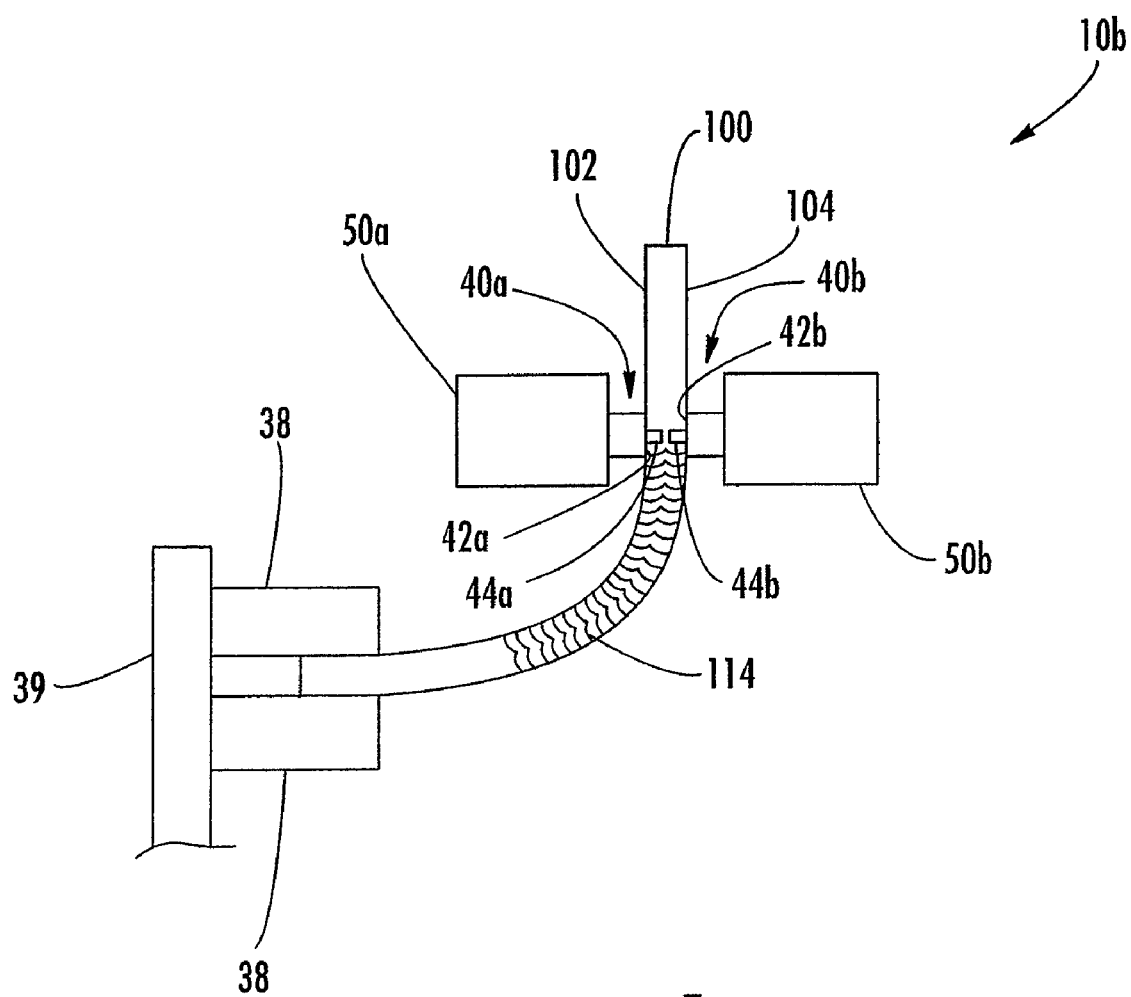
Figure 6:
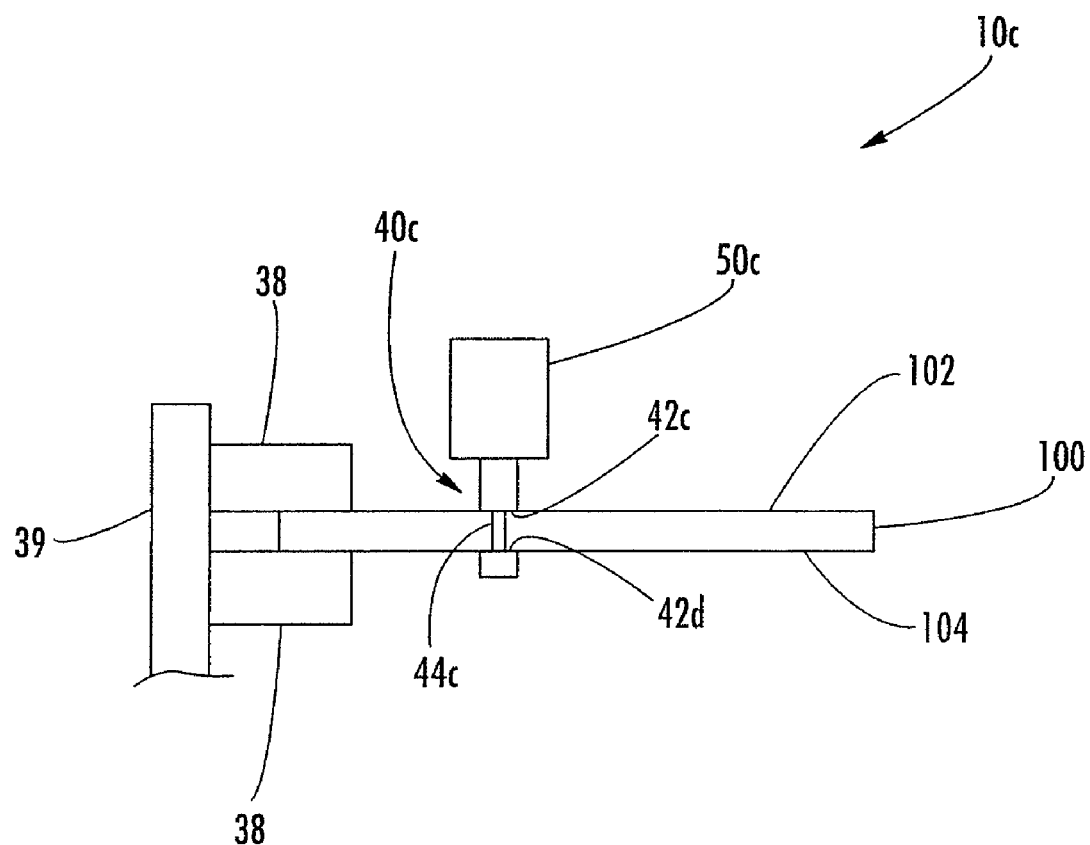

Having thus described the invention in general terms, reference will now be made to the accompanying drawings, which are not necessarily drawn to scale, and wherein:

FIG. 1 is a perspective view illustrating an apparatus for forming a workpiece according one embodiment of the present invention;

FIG. 2 is a section view illustrating the apparatus of FIG. 1, shown with the workpiece partially formed;

FIG. 3 is a section view illustrating an apparatus for forming a workpiece according to another embodiment of the present invention;

FIG. 4 is an elevation view illustrating an apparatus for forming a workpiece according to yet another embodiment of the present invention;

FIG. 5 is an elevation view illustrating the apparatus of FIG. 4, shown with the workpiece partially formed; and FIG. 6 is an elevation view illustrating an apparatus for forming a workpiece according to still another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, and in particular to FIG. 1, there is shown an apparatus 10 for forming a workpiece 100 to a desired configuration. The workpieces 100 can be formed of metal, such as steel, aluminum, titanium, or alloys thereof, polymers, and other materials that are compatible with friction stir processing. The workpieces 100 can be used for a variety of applications including, but not limited to, structural panels, brackets, tubes, caps, and the like. For example, a dome-shaped workpiece 100 and a tubular workpiece 110 (FIG. 3) can be formed and joined to create a closed or partially closed vessel. The workpieces 100 can be used as structural members for vehicles for the aerospace, aeronautical, marine, and automobile industries, or for other structures such as pressure vessels, weaponry, and the like.

The apparatus 10 includes a die 20, which defines a contour surface 22 that corresponds to the desired, non-planar configuration of the workpiece 100. The contour surface 22 of the die 20 shown in FIG. 1 is dome-shaped, but the contour surface 22 can alternatively define other shapes including complex curves, angles, and the like. Preferably, the contour surface 22 is non-planar, i.e., the surface 22 defines one or more curves, angles, or other non-planar features. For example, a non-planar surface can be defined by two or more planar portions that are disposed at an angle. A non-planar surface can also be formed by disposing ridges, channels, or other features on a planar die. The die 20 is secured to a base 30 or frame, which can be configured to rotate or otherwise move the die 20. The die 20 partially receives the workpiece 100, e.g., so that the workpiece 100 is in contact with a portion of the contour surface 22. A bolt 24 or other connection device can be used to secure the workpiece 100 to the contour surface 22 of the die 20.

The apparatus 10 also includes a friction stir forming tool 40 with a shoulder 42 and a pin 44. An actuator 50 is configured to rotate the tool 40 and adjust the tool 40 relative to the die 20 and the workpiece 100. Thus, the actuator 50 can advance the rotating tool 40 toward the workpiece 100 and at least partially penetrate a first side 102 of the workpiece 100 with the pin 44. The actuator 50 is also configured to adjust the tool 40 along a predetermined path so that the rotating pin 44 is moved through the workpiece 100. For example, the actuator 50 can be connected to a linkage or frame 52 that supports and/or moves the actuator 50. In particular, the actuator 50 and/or the frame 52 can be a computer numeric controlled (CNC) device, which can be programmable, as conventionally used for controlling a machining head.

As the rotating pin 44 is moved through the workpiece 100, the pin 44 frictionally heats and plasticizes a region of the workpiece 100. The plasticized region then cools and hardens to form a friction stir formed region 114 having a refined granular structure, as shown in FIG. 2. Thus, the effect on the material properties of the workpiece 100 that results from the friction stir processing operation of the present invention is similar to or the same as that which results from friction stir welding, as described in U.S. Pat. No. 5,460,317 to Thomas, et al., the entirety of which is incorporated herein by reference. As a result of the refined granular structure of the workpiece 100, which generally results from friction stir forming, the material properties of the workpiece 100 can be improved, for example, by increasing the strength and corrosion resistance of the workpiece 100.

The friction stir forming tool 40 and/or the die 20 can be adjustable to move the tool 40 through the workpiece 100. For example, as indicated in FIG. 1, the die 20 is connected to the base 30 via a rotation device 32 that is configured to rotate the die 20 and the workpiece 100 relative to the base 30, either manually or by an actuator (not shown). Further, the friction stir forming tool 40 is configured to be adjusted by the actuator 50 through an arc corresponding to the contour of the die 20, as indicated in FIG. 2. That is, the tool 40 is moved through a curved path and rotated about an axis perpendicular to the longitudinal direction of the pin 44, so that the pin 44 is moved through the workpiece 100. Thus, the friction stir forming tool 40 and the die 20 can be adjusted so that the pin 44 is moved through the entire surface 102 of the workpiece 100. For example, the friction stir forming tool 40 can be adjusted radially outward from the center of the workpiece 100 toward an edge of the workpiece 100 while the die 20 is rotated, thereby adjusting the pin 44 through a spiraling path through the workpiece 100.

In other embodiments, the friction stir forming tool 40 and the die 20 can move in other manners relative to one another. For example, the die 20 can be held stationary while the forming tool 40 is moved throughout the surface 102 of the workpiece 100, and the forming tool 40 can be rotated about multiple axes so that the shoulder 42 is kept substantially parallel to the contour surface 22 of the die 20 and/or the surface 102 of the workpiece 100. In any case, the pin 44 can be perpendicular to the shoulder 42 so that the pin 44 is kept substantially perpendicular to the surface of the workpiece 100 as the shoulder 42 is urged thereagainst, i.e., the pin 44 is perpendicular to a plane tangential to the contour surface 22 at a point collinear with the pin 44.

The pin 44 can be long enough to extend through the entire thickness of the workpiece 100. Alternatively, the pin 44 can be shorter than the thickness of the workpiece 100, for example, about half the thickness of the workpiece 100. Further, the pin 44 can be adjustable relative to the shoulder 42 so that the pin 44 can be extended, as shown in FIG. 2, and retracted, as shown in FIG. 1. Thus, the tool 40 can be used to process workpieces 100 of different thicknesses. In addition, the pin 44 can be adjusted during processing of the workpiece 100 so that the pin 44 can penetrate different portions of the workpiece 100 at different depths. For example, if the workpiece 100 is non-uniform in thickness, the pin 44 can be extended while processing the thicker portions of the workpiece 100 and retracted while processing the thinner portions of the workpiece 100. The pin 44 can also be extended from the shoulder 42 and into the workpiece 100 during the start of each processing operation and/or retracted from the shoulder 42 and, hence, from the workpiece 100 at the end of each processing operation.

As the pin 44 is moved throughout the workpiece 100, the shoulder 42 is urged against the workpiece 100 and urges the workpiece 100 toward the contour surface 22 and to the desired configuration or the workpiece 100. Thus, the workpiece 100 can begin in a flat configuration and can be bent or otherwise formed to the desired shape, as illustrated in FIG. 2. Further, although the thickness of the workpiece 100 is shown to be uniform in FIG. 2, the shoulder 42 can urge the plasticized material from the processed portions of the workpiece 100, thereby forming nonuniformities in the workpiece 100, or forming a uniform workpiece 100 that is thinner throughout. The predetermined path can pass through the entire surface 102 of the workpiece 100, i.e., so that the granular structure of substantially the entire surface 102 is refined. Alternatively, the pin 44 can be passed through only select portions of the workpiece 100, for example, at incrementally spaced locations or at particular portions where grain refinement is desired in the workpiece 100. In addition, detail features 26 such as grooves, ridges, apertures, knobs, and the like can be provided on the contour surface 22 so that, as the workpiece 100 is formed against the die 20, a corresponding detail is formed in the workpiece 100. The detail feature 26 shown in FIGS. 1 and 2 is a groove extending circumferentially around the die 20, which causes a corresponding ridge to be formed in the workpiece 100.

A forming apparatus 10a according to the present invention can also be used to join the workpiece 100 to another member 110. For example, as shown in FIG. 3, the die 20 defines a dome-shaped contour similar to the one shown in FIG. 1. However, an extension 28 is disposed between the base 30 and the die 20 so that an additional member 110, such as a tube, can be disposed proximate to the workpiece 100. The tube 110 is supported by a support member 34 such that the tube 110 is positioned adjacent the workpiece 100 when the workpiece 100 is formed to the desired configuration so that an interface 112 is defined therebetween. Clamping members 36 can also be provided for securing the tube 110 to the support member 34. Further, the tube 110 and the die 20 are supported by the rotation device 32 and are rotatable relative to the friction stir forming tool 40. As shown in FIG. 3, the pin 44 of the friction stir forming tool 40 can be inserted at the interface 112 of the workpiece 100 and the tube 110, and the workpiece 100 and the tube 110 can be rotated by the rotation device 32 so that the pin 44 is adjusted through a circumferential path defined by the interface 112. The friction stir forming tool 40 frictionally heats and plasticizes material of the tube 110 and workpiece 100 at the interface 112, thereby forming a friction stir weld joint at the interface 112. Thus, after the workpiece 100 is formed, the workpiece 100 can be joined to the additional member 110, and the joining can be performed in the same apparatus 10a as the forming operation.

FIGS. 4 and 5 illustrate another forming apparatus 10b of the present invention in which the workpiece 100 is formed by two opposed friction stir forming tools 40a, 40b. Each of the tools 40a, 40b can be similar to the tool 40 described above, including a shoulder 42a, 42b and a pin 44a, 44b extending therefrom. The tools 40a, 40b are positioned opposite the workpiece 100 so that the shoulders 42a, 42b are directed inward toward opposite sides 102, 104 of the workpiece 100. The workpiece 100 is supported by clamping members 38 or other support devices, which are secured to a base or frame 39. For example, the clamps 38 can be mechanical or hydraulic clamps that secure the workpiece 100 in position. Actuators 50a, 50b, which are connected to a linkage or frame, rotate the tools 40a, 40b and adjust the tools 40a, 40b along predetermined paths. Thus, the actuators 50a, 50b rotate the pins 44a, 44b and urge the tools 40a, 40b inward. The pins 44a, 44b at least partially penetrate the opposite sides 102, 104 of the workpiece 100, and the actuators 50a, 50b move the tools 40a, 40b along the predetermined path so that the regions of the workpiece 100 are plasticized and the shoulders 42a, 42b of the tools 40a, 40b urge the workpiece 100 to the desired configuration. For example, the actuators 50a, 50b can translate along the length of the workpiece 100, while maintaining the shoulders 42a, 42b in a parallel configuration. The actuators 50a, 50b can also rotate about an axis perpendicular to the longitudinal axis of the pins 44a, 44b, e.g., between the positions shown in FIGS. 4 and 5, thereby urging the workpiece 100 to a curved configuration. More complex shapes, including three-dimensionally curved surfaces, can also be formed in this manner, e.g., by adjusting one or both of the friction stir forming tools 40a, 40b in two or more linear directions and about two or more axes of rotation. In the formed configuration, the workpiece 100 defines friction stir formed regions 114 that are defined by a refined granular structure.

As illustrated in FIG. 4, the pins 44a, 44b of the friction stir forming tools 40a, 40b can have a length that is about half of the thickness of the workpiece 100 or less so that the pins 44a, 44b do not contact one another when urged into the workpiece 100 from opposite sides. Each pin 44a, 44b can also be adjustable relative to the respective shoulder 42a, 42b, so that the pin 44a, 44b can be extended or retracted therefrom, as described above. Further, the pins 44a, 44b can be inserted into the workpiece 100 at slightly different positions so that one of the pins 44a, 44b "leads" the other pin 44a, 44b along the predetermined path. In either case, the friction stir formed regions 114 can extend through the entire thickness of the workpiece 100. The tools 40a, 40b can be used to plasticize successive portions of the workpiece 100 until the entire workpiece 100 or only select portions of the workpiece 100 have been processed. Also, while a single workpiece 100 is illustrated in FIGS. 4 and 5, it is understood that the workpiece 100 can be formed of multiple members and that the friction stir forming tools 40a, 40b can join the members by friction stir welding.

As illustrated in FIG. 6, a forming apparatus 10c can include two opposed shoulders 42c, 42d that are defined by a single self-reacting friction stir forming tool 40c. The shoulders 42c, 42d are connected by a pin 44c which extends through the workpiece 100 so that the first shoulder 42c is directed toward the first side 102 of the workpiece 100 and the second shoulder 42d is directed toward the second side 104 of the workpiece 100. An actuator 50c, similar to the actuators 50, 50a, 50b described above, is connected to the friction stir forming tool 40c and configured to adjust the tool 40c through the workpiece 100. At the start of a processing operation, the pin 44c can be introduced into the workpiece 100 from an end of the workpiece 100, or the pin 44c can be disconnected from one or both of the shoulders 42c, 42d so that the pin 44c can be disposed through a hole in the workpiece 100 and assembled with the shoulders 42c, 42d as shown. The actuator 50c can then adjust the tool 40c though the workpiece 100 along a nonplanar path so that the rotating pin 44c plasticizes portions of the workpiece 100, and the shoulders 42c, 42d urge the workpiece 100 to a desired, nonplanar configuration.

After friction stir forming by any of the processes described above, the workpiece 100 and any additional members 110 thereof can also be otherwise processed in the apparatus 10, 10a, 10b, 10c. For example, the workpiece 100 can be machined to predetermined tolerances by a machining head (not shown), which can replace the friction stir forming tool 40, 40a, 40b, 40c on the actuators 50, 50a, 50b, 50c or can be provided separately. Further, heat treatments can be performed by heating and cooling the workpiece 100 to one or more predetermined temperatures according to a predetermined schedule. The heat treatment(s) can be performed while the workpiece 100 is secured in the apparatus 10, 10a, 10b, 10c, or the workpiece 100 can be removed from the apparatus 10, 10a, 10b, 10c and heat treated in a different device.

Many modifications and other embodiments of the invention set forth herein will come to mind to one skilled in the art to which these inventions pertain having the benefit of the teachings presented in the foregoing descriptions and the associated drawings. For example, while the shoulders 42, 42a, 42b, 42c, 42d of the forming tools 40, 40a, 40b, 40c are used to urge the workpiece 100 to the desired configuration in the foregoing examples, it is also appreciated that the workpiece 100 can be bent, i.e., at least partially elastically, to the desired shape and restrained in that shape while the forming tools 40, 40a, 40b, 40c process the workpiece 100 by friction stir forming, such that the workpiece 100 maintains the desired shape after being released. The restraint can be accomplished using mechanical or hydraulic clamps or other restraining devices. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for forming a workpiece in accordance with a contour surface that defines a dome, the apparatus comprising:
    a die having the contour surface corresponding to a desired, non-planar configuration of the workpiece, wherein the contour surface of the die defines the dome;
    a friction stir forming tool defining a shoulder and a rotatable pin extending from the shoulder, the tool being configured to urge the shoulder and pin toward the contour surface of the die such that the shoulder urges the workpiece against the die and to the desired configuration, and the pin at least partially penetrates the workpiece and rotates to form a friction stir formed region defined by a refined granular structure; and
    an actuator for adjusting the friction stir forming tool, the actuator configured to adjust the tool along a predefined path corresponding to the contour surface of the die and along the dome defined by the die such that the shoulder is urged against the workpiece in a direction toward the contour surface to thereby bend the workpiece toward the contour surface and to the desired, non-planar configuration,
    wherein the friction stir forming tool is configured to urge the shoulder toward the workpiece at different locations along the workpiece in order to urge plasticized material from a portion of the workpiece that has been processed by the friction stir forming tool to form non-uniformities in the workpiece.

2. An apparatus according to claim 1 wherein the actuator is configured to move the tool through a curved path and to rotate the tool about an axis perpendicular to a longitudinal direction of the pin, such that the shoulder imparts a non-planar configuration to the workpiece.

3. An apparatus according to claim 1 wherein the pin is about half the thickness of the workpiece.

4. An apparatus according to claim 1 wherein the actuator is configured to adjust the friction stir forming tool in at least two linear directions and about at least two axes of rotation.

5. An apparatus according to claim 1 wherein the contour surface of the die defines at least one detail feature.

6. An apparatus according to claim 1 wherein the die is configured to be rotated relative to the friction stir forming tool.

7. An apparatus according to claim 1 wherein the friction stir welding tool is configured such that the pin is extendible and retractable relative to the shoulder based upon a thickness of the workpiece.

* * * * *